US008073749B2

(12) United States Patent
Zargahi et al.

(10) Patent No.: US 8,073,749 B2
(45) Date of Patent: Dec. 6, 2011

(54) DIGITAL CONTENT BILLING VIA MULTIPLE CHANNELS

(75) Inventors: Kamran R. Zargahi, Seattle, WA (US);
John Bruno, Snoqualmie, WA (US);
Daniel Bouie, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 105 days.

(21) Appl. No.: 12/472,065

(22) Filed: May 26, 2009

(65) Prior Publication Data
US 2010/0306090 A1    Dec. 2, 2010

(51) Int. Cl.
*G07F 19/00*   (2006.01)
*H04M 15/00*   (2006.01)
(52) U.S. Cl. ....... 705/34; 455/406; 455/418; 379/114.2; 379/114.01; 379/114.16
(58) Field of Classification Search ........................ None
See application file for complete search history.

(56) References Cited

U.S. PATENT DOCUMENTS

| | | | | |
|---|---|---|---|---|
| 5,825,863 | A * | 10/1998 | Walker ........................ | 379/114.2 |
| 5,960,416 | A * | 9/1999 | Block ............................. | 705/34 |
| 7,181,419 | B1 | 2/2007 | Mesaros | |
| 7,729,483 | B2 * | 6/2010 | Van Natter et al. ...... | 379/114.03 |
| 2003/0149581 | A1 | 8/2003 | Chaudhri et al. | |
| 2005/0044197 | A1 * | 2/2005 | Lai ................................ | 709/223 |
| 2006/0069635 | A1 | 3/2006 | Ram et al. | |
| 2006/0190290 | A1 | 8/2006 | Gomez | |
| 2007/0011050 | A1 | 1/2007 | Klopf et al. | |
| 2008/0057904 | A1 * | 3/2008 | Pousti .......................... | 455/406 |
| 2008/0154798 | A1 | 6/2008 | Valz | |
| 2008/0162371 | A1 | 7/2008 | Rampell et al. | |
| 2009/0063251 | A1 | 3/2009 | Rangarajan et al. | |

OTHER PUBLICATIONS

Shefer, Daniel, "Pricing for Software Product Manager", Retrieved at <<http://www.pragmaticmarketing.com/publications/magazine/3/5/0507ds1_1>>, May 12, 2009, pp. 15.

* cited by examiner

*Primary Examiner* — Ryan Zeender
*Assistant Examiner* — Ariel Yu
(74) *Attorney, Agent, or Firm* — Alleman Hall McCoy Russell & Tuttle LLP

(57) ABSTRACT

Embodiments related to billing for digital content via multiple billing channels with different permissible prices are disclosed. One disclosed embodiment comprises a digital content server configured to receive from a content provider an input of a digital content item, send to the content provider a list of suggested prices that are permissible in each billing channel, and then receive an input of a selected price for the content item. If the selected price is from the list of suggested prices, then billing is enabled via each of the billing, prices, then billing is enabled via each of the billing. On the other hand, if the selected price for the digital content item is not from the list of suggested prices, then billing is enabled via a first subset of billing channels for which the selected price is permissible, and not enabled via a second subset of billing channels for which the selected price is not permissible.

20 Claims, 7 Drawing Sheets

Fig. 3

| € SPAIN (3082) | |
|---|---|
| MO 1 | 0.3, 0.4, 0.6, 0.9, 1.2, 1.5, 3.99 |
| MO 2 | 0.3, 0.5, 0.6, 0.8, 0.9, 1.2, 1.5, 1.99, 2.99 |
| MO 3 | 0.1, 0.2, 0.3, 0.5, 0.6, 0.7, 0.9, 1.0, 1.2, 1.5, 1.8, 1.99, 2.99, 3.99 |
| PPG LIST | 0.3, 0.6, 0.9, 1.2, 1.5 |

| £ UNITED KINGDOM (2057) | |
|---|---|
| MO 1 | 0.25, 0.3, 0.4, 0.5, 0.9, 1.0, 1.5, 2.5, 3.0, 3.99, 4.99, 5.0, 7.99 |
| MO 2 | 0.25, 0.5, 0.6, 0.8, 0.9, 1.0, 1.3, 1.5, 1.99, 2.99, 3.0, 4.5, 5.0, 6.99 |
| PPG LIST | 0.25, 0.50, 1.0, 1.5, 3.0, 5.0 |

| $ UNITED STATES (1033,21514) | |
|---|---|
| MO 1 | 0.25, 0.3, 0.4, 0.5, 0.75, 0.99, 1.0, 1.99, 2.99, 3.99, 4.99, 5.99, 7.99, 9.99 |
| MO 2 | 0.25, 0.3, 0.49, 0.5, 0.75, 0.99, 1.0, 1.99, 2.99, 3.99, 5.0, 5.99, 7.99, 9.99 |
| MO 3 | 0.30, 0.50, 0.75, 0.99, 1.0, 1.99, 2.99, 5.99, 7.99, 9.99 |
| MO 4 | 0.1, 0.30, 0.50, 0.75, 0.99, 1.0, 1.5, 1.99, 2.99, 5.99, 7.99, 9.99 |
| PPG LIST | 0.30, 0.50, 0.75, 0.99, 1.0, 1.99, 2.99, 5.99, 7.99, 9.99 |

Fig. 4

| PRICE LEVEL | $ - PRICE POINT (PARENT MARKET) | £ - UNITED KINGDOM (2057) | € - SPAIN (3092) | ... | $ - OTHER MARKET (000000) |
|---|---|---|---|---|---|
| 1 | 0.30 | 0.25 | 0.30 | ... | 0.25 |
| 2 | 0.50 | 0.50 | 0.60 | ... | 0.52 |
| 3 | 0.75 | 0.50 | 0.60 | ... | 0.73 |
| 4 | 0.99 | 1.00 | 0.90 | ... | 1.00 |
| 5 | 1.00 | 1.00 | 0.90 | ... | 1.00 |
| 6 | 1.99 | 1.50 | 1.20 | ... | 1.85 |
| 7 | 2.99 | 3.00 | 1.50 | ... | 3.00 |
| 8 | 5.99 | 5.00 | X | ... | 5.75 |
| 9 | 7.99 | X | X | ... | 7.50 |
| 10 | 9.99 | X | X | ... | 10.5 |

Fig. 5

| | | UNITED STATES | | UNITED KINGDOM | | SPAIN | | ... | GEO #n | |
|---|---|---|---|---|---|---|---|---|---|---|
| DIGITAL CONTENT ITEM 1 (En-US) | $0.99 | MO ☑ | £1.00 | MO ☑ | €0.90 | MO ☑ | ... | µ1.00 | MO ☑ |
| | | CC ☑ | | CC ☑ | | CC ☑ | | | CC ☑ |
| DIGITAL CONTENT ITEM 1 (En-US) | $0.99 | MO ☑ | £1.00 | MO ☑ | €0.95 | MO ☐ | ... | µ1.00 | MO ☑ |
| | | CC ☑ | | CC ☑ | | CC ☑ | | | CC ☑ |
| DIGITAL CONTENT ITEM 1 (Es-Es) | €0.90 | MO ☑ | £1.00 | MO ☑ | $0.99 | MO ☑ | ... | µ1.00 | MO ☑ |
| | | CC ☑ | | CC ☑ | | CC ☑ | | | CC ☑ |

500

502 → UK MO (row 1)
504 → UK MO (row 2)
506 → UK MO (row 3)

Fig. 6

DIGITAL CONTENT BILLING VIA MULTIPLE CHANNELS

BACKGROUND

Various mobile devices, including but not limited to smart phones, netbooks, other notebook computers, personal media players, and the like, may be configured to allow a user to install and run various applications such as games, utilities, etc., as well as to download and play media content. These and other types of digital content may be provided by a mobile service provider, mobile device manufacturer, mobile device software manufacturer, and/or third party, via a digital content server from which users can download content, sometimes for a fee.

In some environments, users may obtain digital content for a particular device from a single source, such as a digital content server managed by a mobile device manufacturer, via a single channel, such as a desktop client running on a computer to which the mobile device is connected (e.g. via a tether, wireless connection, etc.). In such use environments, billing for digital content may be performed by credit card and/or debit card information provided to the digital content server. Such billing channels generally allow a digital content provider to assign any desired price to a digital content item.

On the other hand, some types of digital content (e.g. ringtones) may be purchased directly from a mobile operator such that the content is billed to a purchaser's mobile operator account, rather than to a credit or debit card. In many cases, mobile operator billing may not allow any desired price to be set for a digital content item, but instead may allow a relatively small set of permissible prices to be set.

SUMMARY

Various embodiments related to billing for digital content via multiple billing channels with different permissible prices are disclosed. For example, one disclosed embodiment comprises a digital content server system comprising a processor, and memory comprising instructions executable by the processor to receive from a content provider an input of a digital content item, send to the content provider a list of suggested prices, wherein each price in the list is permissible in each billing channel of the plurality of billing channels, and then receive from the content provider an input of a selected price for the digital content item. If the selected price for the digital content item is from the list of suggested prices, then billing for the content item is enabled via each of the billing channels of the plurality of billing channels. On the other hand, if the selected price for the digital content item is not from the list of suggested prices, then billing for the content item is enabled via a first subset of billing channels for which the selected price is permissible, and not enabled via a second subset of billing channels for which the selected price is not permissible.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments are disclosed herein that relate to billing for digital content via multiple billing channels with different permissible prices are disclosed. The disclosed embodiments may enable a digital content item to be billed at a consistent price even where billing may be performed through multiple mobile operators with different permissible prices. It will be understood that the term "mobile device" as used herein may represent any suitable mobile device, including but not limited to, smart phones and other cellular phones, notebook computers such as so-called "netbooks", portable media players, personal digital assistants, etc. Further, the term "mobile device digital content server" may include any server configured to provide any suitable digital content, including but not limited to applications and media items, to mobile devices over any suitable communications channel.

An example embodiment of a mobile device use environment 100 is described with reference to FIG. 1. Mobile device use environment 100 comprises a plurality n of mobile devices (depicted as three mobile device 102 (mobile device 1), 104 (mobile device 2), and 106 (mobile device n)) that are in communication with a plurality m of mobile networks, depicted as two example mobile networks 108 (network 1) and 109 (network m), wherein networks m and n are operated by different mobile operators. Via mobile networks, 108 and 109, mobile devices 102, 104, 106 may communicate with each other in various ways, including but not limited to via voice data, instant messaging, email, etc. In the depicted embodiment, three mobile devices communicating with two mobile networks are shown for the purpose of example, but it will be understood that any suitable number of mobile devices may be in communication with any suitable number of mobile networks. Generally, each mobile device will communicate preferentially with a mobile network associated with a mobile operator with whom a user has a billing account associated with the device, but may connect to other mobile networks if the primary mobile network is not connectable (e.g. out-of-range), as indicated by the dashed-line connection of mobile device 104 to mobile network 109.

Each mobile device comprises memory 110 configured to store computer-readable instructions such as applications and other programs, and a processor 112 configured to execute the applications and other programs stored in memory 110. Generally, programs include routines, objects, components, data structures, and the like that perform particular tasks or implement particular abstract data types. The term "program" as used herein may connote a single program or multiple programs acting in concert, and may be used to denote applications, services, or any other type or class of program.

Mobile devices 102, 104, 106 also may be in communication with a TCP/IP data network, such as a WAN 114, as another channel of communication. For example, as depicted in FIG. 1, mobile device n 106 may be configured to connect to a WAN such as the Internet via a wireless protocol such as 802.11a, 802.11b, 802.11g, 802.11n, or any other suitable protocol.

Mobile devices 102, 104 and 106 may communicate with a mobile device digital content server system 116 via the mobile networks 108 and 109 and/or WAN 114. It will be understood that, when a mobile device communicates with a mobile device application server over a mobile network, the communication may actually occur via a combination of the mobile network and a data network to which the mobile network interfaces.

Figure 1:
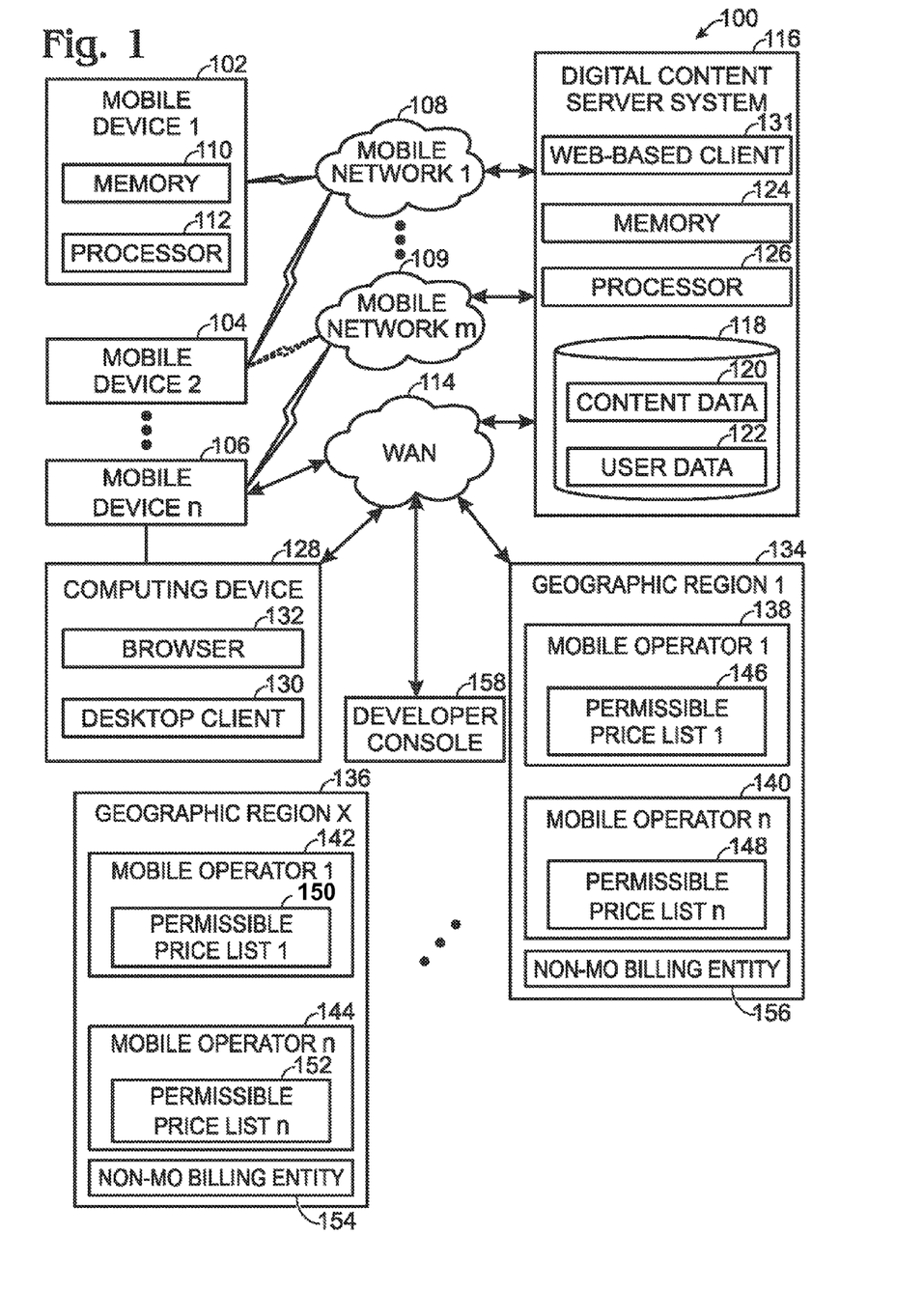
FIG. 1 shows an example embodiment of a digital content development and distribution system.

Digital content server system 116 may further comprise one or more databases, represented by database 118 in FIG. 1, that store digital content and various items of data related to the provision of such digital content to mobile devices. For example, as depicted in FIG. 1, the database 118 may comprise application data 120. Such application data 120 may include binary (or other type) application files that are downloadable by mobile devices 102, 104, and 106, as well as metadata related to the application files that allow users of mobile devices 102, 104 and 106 to use search queries to locate desired applications that are compatible with the users' mobile devices. It will be understood that the application data 120 may contain applications provided by multiple developers for multiple different types and brands of mobile devices, each of which may run different operating systems, different versions of like operating systems, and may operate in different geographic regions with different languages and currencies.

Database 118 also may store user data 122. The user data 122 may include data related to individual users, including but not limited to a user's identity, account number, credit card/debit card/other payment mechanism (e.g. mobile operator billing), type of mobile device used by each user, geographic location of each user, language preferences of each user, etc.

Continuing with FIG. 1, the digital content server system 116 comprises memory 124 configured to store computer readable instructions executable by a processor 126 and/or other logic components to perform the various tasks in the course of managing the provision of digital content to mobile devices and billing for the content. For example, such instructions may be executable to communicate with mobile devices 102, 104, and 106 over the mobile network 108 and/or WAN 114, to communicate with the database 118 to execute search queries and communicate search results to the mobile devices 102, 104 and 106, and to perform various other functions and operations, including but not limited to those described herein.

The digital content server system 116 also may be configured to provide digital content to mobile devices via other communication channels. For example, as depicted in FIG. 1, a mobile device 106 may be configured to be connected (via a tether, wireless connection, etc.) to a computing device 128, such as a laptop or desktop computer, to allow communication with the digital content server system 116 via the computing device 128. Such communication may take place via a desktop client 130 installed on the computing device 128, via a network-based client 131 ("web-based client) on mobile device application server 116 and accessible via an Internet browser application 132, or in any other suitable manner. It will be understood that such a browser also may be run directly on mobile devices 102, 104, and 106.

Continuing with FIG. 1, mobile operators in various different geographic regions may be able to interact with the digital content server system 116, for example, to execute billing transactions for content purchased from the digital content server system 116. A plurality x of geographic regions (e.g. countries or other geographic expanses, whether contiguous or separated, that share a common currency, common language(s), etc.) are shown as two example geographic regions 134, 136. Each geographic region 134, 136 comprises a plurality of mobile operators that operate mobile networks in that region. For example, mobile operators 138, 140 are shown in geographic region 134, and mobile operators 142, 144 are shown in geographic region 136.

Each mobile operator in each geographic region may have its own set of permissible prices for mobile operator billing. These are indicated in FIG. 1 at 146, 148, 150, and 152 for mobile operators 138, 140, 142, and 144, respectively. Further, each geographic region may have one or more non-mobile operator billing entities, as shown at 154 and 156 for geographic region 134 and geographic region 136, respectively. As mentioned above, some mobile operators may be configured to execute billing for content on discrete permissible prices in a desired currency, rather than at any desired price. Such billing may be referred to herein as "quantum billing" to distinguish it from "continuum billing" in which any price in increments of the smallest unit of a currency may be used. Quantum billing may be used by some mobile operators because those mobile operators' payment gateways may utilize legacy billing systems that are SMS-based (Simple Message Service), in which permissible prices are hard-coded. As such, the permissible prices for a mobile operator may be pre-defined, and may change infrequently. Therefore, as described below, lists of permissible prices may be pre-compiled and stored on digital content server system 116 to assist a digital content provider with setting prices for digital content items.

Continuing with FIG. 1, digital content providers, such as independent software developers, media companies (e.g. music, television, movies), etc. may submit applications, pricing information, updates, revocations, for inclusion on the mobile device application server 116 via a developer console 158 that may be provided, for example, as a part of a software development kit provided by the operator of the mobile device application server 116, by a mobile operator, etc. A single developer console is shown for the purpose of example, but it will be understood that any suitable number of developers may communicate with the application server 116 via development consoles.

It will be understood that mobile device use environment embodiment 100 depicted in FIG. 1 is shown for the purpose of example, and is not intended to be limiting in any manner.

Many customers purchasing digital content from digital content server system 116 may wish to use mobile operator billing for the purchase transaction such that the transaction is billed directly to the user's mobile device account. On the other hand, other users may wish to bill purchase transactions to a credit card, debit card, or via other such billing channel (s). As described above, some billing channels, such as credit or debit cards, may support continuum billing that allows any desired pricing, while other billing channels, such as mobile operator billing, may support billing quantum billing that allows a more limited set of permissible prices. However, a digital content provider submitting digital content for sale via digital content server system 116 may not be aware of the permissible prices for each mobile operator. Therefore, situations may arise where a price selected by a digital content provider for a digital content item is not permissible under one or more mobile operator billing systems.

Figure 2A:
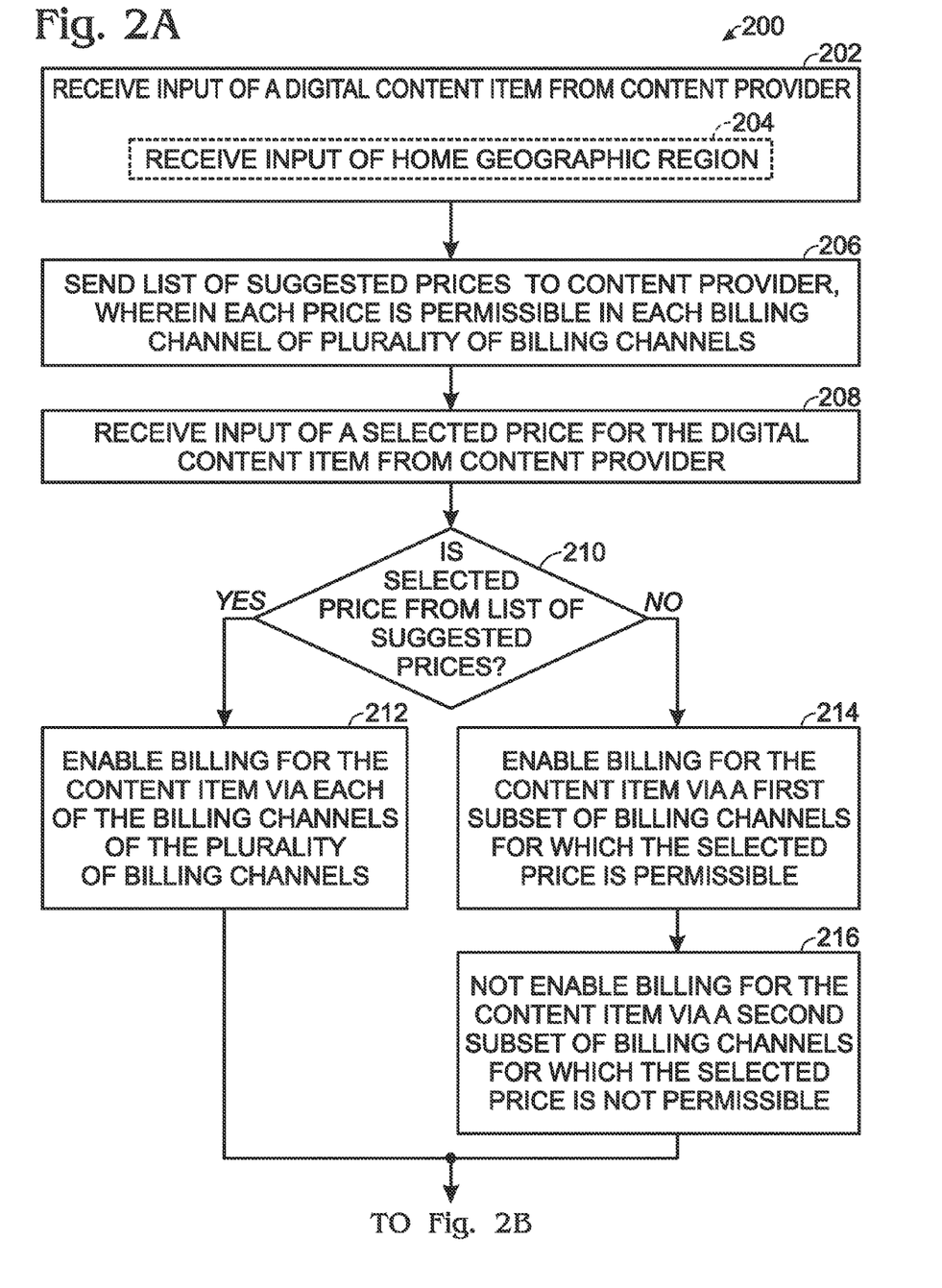
FIGS. 2A and 2B show a flow diagram depicting an embodiment of a method for pricing digital content on a digital content server system.
Figure 2B:
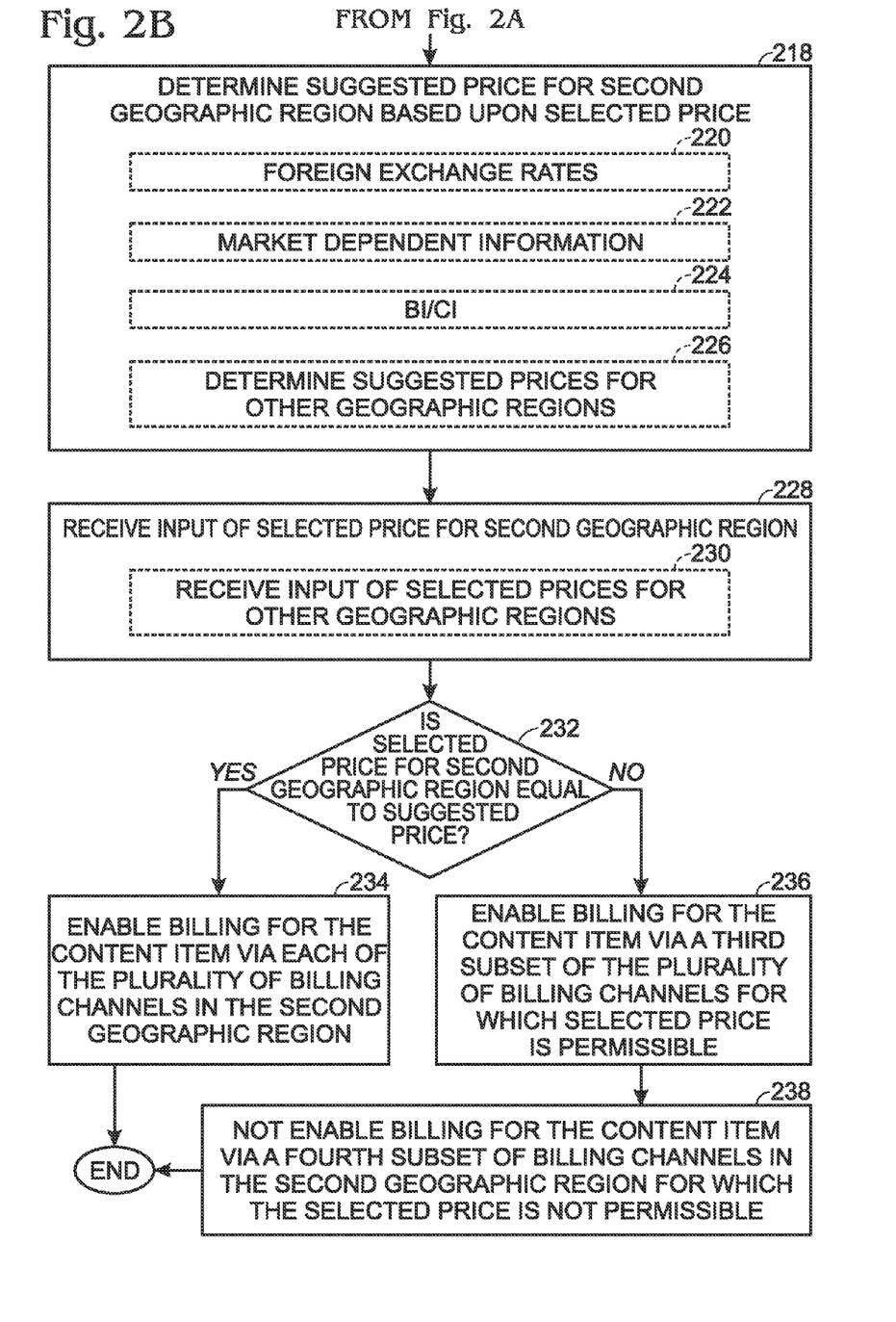

Accordingly, FIG. 2 shows an embodiment of a method 200 for selecting prices for digital content to be provided via a digital content server system that supports billing via two or more billing channels with different price points. Method 200 comprises, at 202, receiving an input of a digital content item from a content provider. The digital content item may be an application, a media item (e.g. song, movie, television show, still image, etc.), or any other suitable type of digital content. Further, in embodiments where a digital content server system is configured to provide content to users in multiple geographic regions, method 200 may further comprise, at 204, receiving an input that designates a home geographic region for the content item. The choice of a home geographic region may be influenced by any of a number of factors, including but not limited to a language used in the digital content item, a rating system used to rate the digital content item, etc.

Next, method 200 comprises, at 206, sending a list of suggested prices to the content provider, wherein each price is permissible in each billing channel of a plurality of billing channels that may be used to purchase the digital content item. In other words, each price on the suggested list of prices is allowed by each mobile operator's billing system in the geographic region(s) in which the content item is to be sold. Therefore, by selecting a price from the list of suggested prices, a digital content provider may ensure that a consistent price is charged for the content item by all mobile operators in the geographic region of interest. Likewise, the list also helps to inform the content provider that any selection of a price not on the list will result in the content item not being eligible for mobile operator billing by one or more mobile operators in the geographic region of interest.

The list of suggested prices sent at 206 may be sent in response to an input of an initial price selection, or may be sent before the content provider makes any price selection. For example, in one embodiment, a content provider may submit an initial price for the content item at the same time the content item and any home geographic region information is submitted. In this case, the initial price is compared to the list of suggested prices, and closest price matches ,au be sent to the content provider. In this case, the list of suggested prices in some examples may have one or two suggested prices. In other embodiments, a list of all suggested prices for a geographic region of interest is sent to the content provider prior to the content provider submitting a price selection. It will be appreciated that these specific embodiments are presented for the purpose of example, and are not intended to be limiting in any manner.

Figure 3:
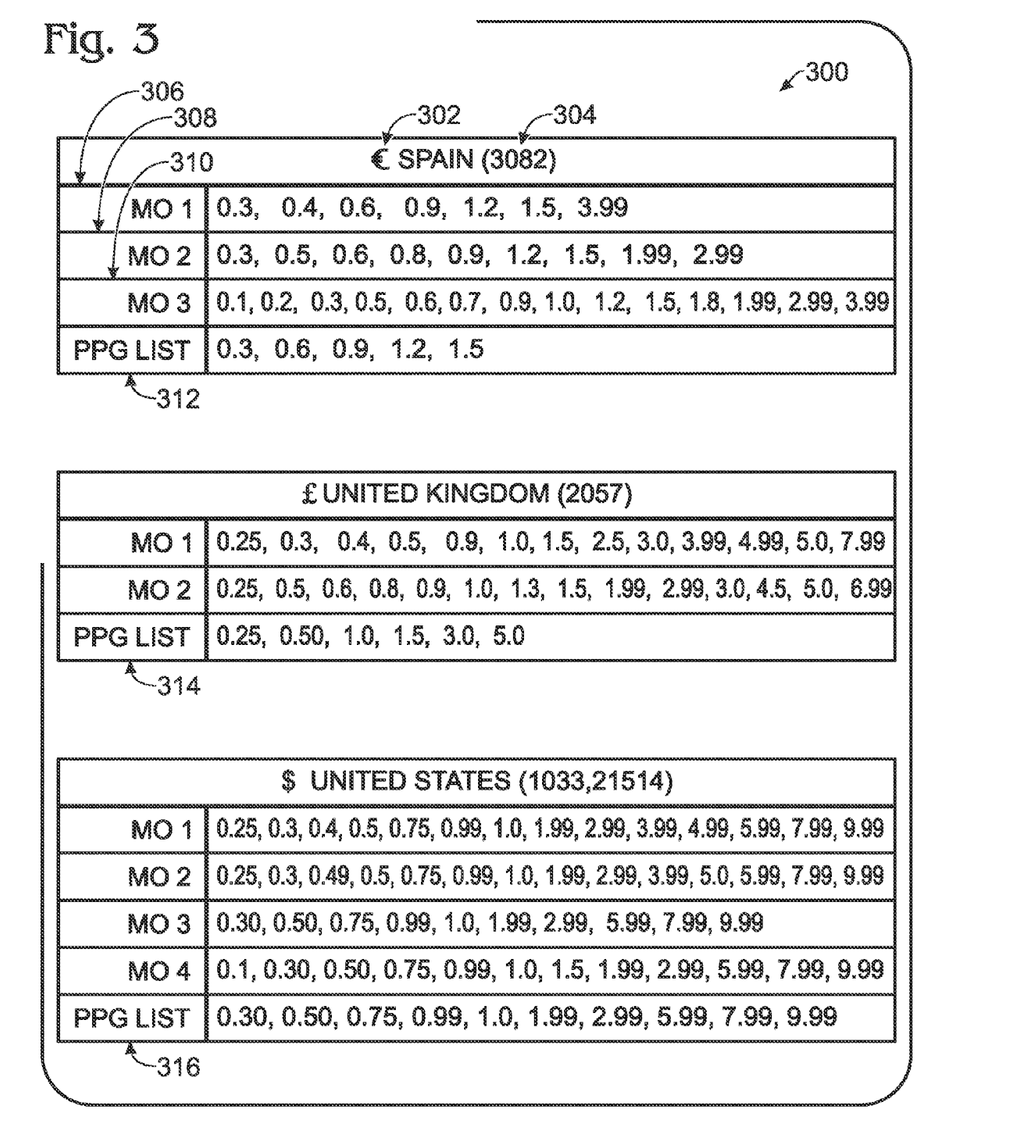
FIG. 3 shows example embodiments of permissible pricing lists for a plurality of geographic regions.

The list of suggested prices may be determined in any manner. For example, in some embodiments, a list of prices that are common to all supported billing channels is pre-compiled for each geographic region served by the digital content server system. FIG. 3 shows an example of several such price lists for three geographic regions. First, at 300, a price list is shown for Spain. The price list for Spain 300 specifies a currency 302 for the prices (Euros), and also an example geographic code 304 used to identify the geographic region as Spain. Next, the price list for Spain 300 comprises, at 306, 308, and 310, example price points, or permissible prices, utilized by three hypothetical mobile operators that operate networks in Spain. It can be seen that the price points for each hypothetical mobile operator are not identical with the price points utilized by other mobile operators, but also that some overlap between lists exists. Therefore, at 312, the price list for Spain 300 comprises a list of price points that are common to each of the mobile operators in the list. The term "PPG list", or price-per-geographic location list, may be used herein to denote this list of price points that are common to all supported mobile operators in a geographic region. FIG. 3 also shows PPG lists for the UK at 314, and for the US at 316.

Continuing with FIG. 2, method 200 next comprises, at 208, receiving from the content provider an input of a selected price for the digital content item after sending the list of suggested prices to the content provider. Then, at 210, it is determined whether the selected price is equal to a price from the list of suggested prices (PPG list). If the selected price is equal to a price from the list of suggested prices, then at 212, method 200 comprises enabling billing for the content item via each of the billing channels of the plurality of billing channels, including all mobile operator billing channels for the applicable geographic region.

On the other hand, if the selected price is not equal to a price from the list of suggested prices, then method 200 comprises, at 214, enabling billing for the digital content item via a first subset of billing channels for which the selected price is permissible, and, at 216, not enabling billing for the digital content item via a second subset of billing channels for which the selected price is not permissible. The first and second subsets of billing channels may each include any suitable billing channels. For example, in some embodiments, billing may be enabled only for non-mobile operator billing, even where the selected price equals a permissible price of some (but not all) mobile operators for that geographic region. In other embodiments, billing may be enabled for any subset of mobile operators for whom the selected price is permissible, and not enabled for any subset of mobile operators for whom the selected price is not permissible. It will be understood that a user may utilize mobile operator billing when purchasing mobile billing-enabled digital content in any suitable manner, including but not limited to purchasing via a mobile device, a desktop client, a web-based client, etc.

In some embodiments, a digital content server system may be configured to provide digital content to mobile devices in a single geographic region. In this case, method 200 may end upon performing processes 232-238. On the other hand, where the digital content server system is configured to provide digital content to a plurality of geographic regions, method 200 may continue to 218 and determine suggested prices for the content item for a second geographic region in the currency of the second geographic region based upon the selected price in the home geographic region currency. For example, in some situations, users who are outside of the home geographic region for a digital content item may still wish to purchase the item. However, the second geographic region may have different permissible prices than the home geographic region. Therefore, a price selected for the home geographic region likely will not equal a permissible price in the second geographic region. Further, because the selected price specifies a price for the digital content item in the currency of the home geographic region, fluctuating currency exchange rates may cause further difficulties with mobile operator billing in the second geographic region. Therefore, by providing one or more suggested prices in the currency of the second geographic region that are taken from the PPG list for the second geographic region, method 200 may facilitate the use of mobile operator billing for the purchase of a digital content item outside of that digital content item's home geographic region.

In some embodiments, suggested prices in the currency of the second geographic region may be fixed relative to prices in the home geographic region. In this case, suggested prices in the currency of the second geographic region may be provided by simply sending a list of the permissible prices that correspond to the selected price received for the home geographic region. In other embodiments, suggested prices in the currency of the second geographic region may be determined dynamically based upon various factors. For example, as depicted at 220, current foreign exchange rates may be taken into account to locate a closest permissible price in the second geographic region. Likewise, as depicted at 222, various market-dependent information may be taken into account, including but not limited to optimal price ranges for digital content. Further, as depicted at 224, business intelligence and customer intelligence (BI/CI) may be taken into account when determining a suggested price for the second geographic region. Business intelligence and customer intelligence comprise information that is gathered over time from customer behavior related to purchasing digital content from the digital content server system that may influence pricing choices. Examples of business intelligence and customer intelligence include, but are not limited to, an average purchase price points for apps of a certain genre or category, and/or a popularity of a particular application type in different markets vs. another. For example, if an application type is more popular in Italy than Turkey, then demand in Italy may support a higher price point.

Further, in some embodiments, a digital content server system may be configured to provide digital content to users in more than two geographic regions. Therefore, method 200 may comprise, at 226, determining suggested prices for a plurality of other geographic regions than the home geographic region and second geographic region.

Figure 4:
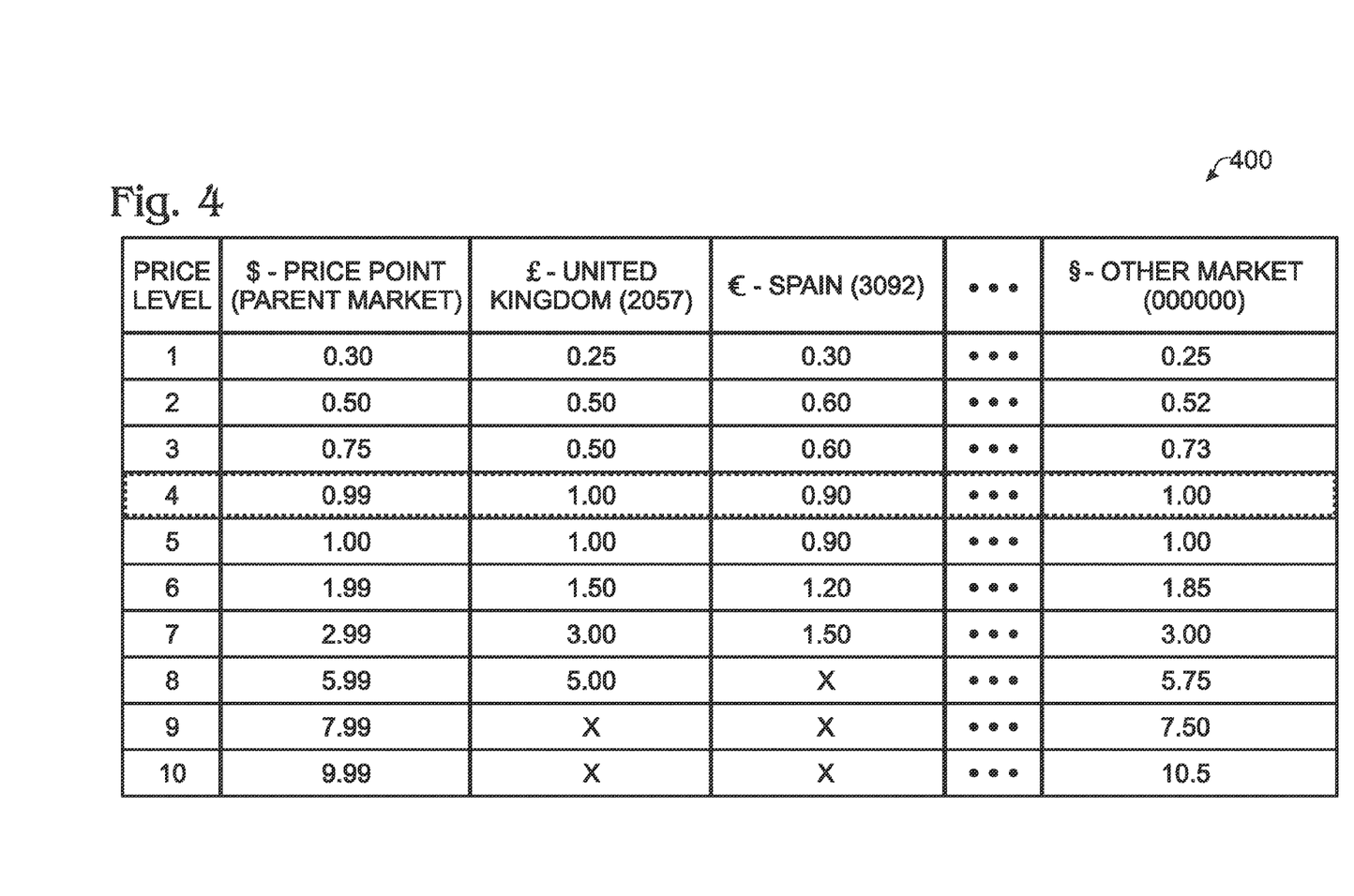
FIG. 4 shows an example embodiment of a suggested price list for a plurality of geographic regions.

FIG. 4 shows an example of a price matrix 400 comprising a list of suggested prices determined for the UK, Spain, and an arbitrary "other market" based upon a selected U.S. price. The price matrix may first be assembled based upon the foreign exchange information, market-dependent information, and business intelligence/customer intelligence information described above. Then, UK, Spanish, and other prices that fall in a same row of the price matrix 400 as the selected U.S. price may be provided as suggested prices for those geographic regions. It will be noted that the price matrix 400 is determined based upon the home geographic region selection. Therefore, in the case where Spain or other country is selected as a home geographic region for the same digital content item used to prepare the matrix of FIG. 4, the resulting matrix may or may not have the same configuration as that shown in FIG. 4.

Further, some geographic regions may not have mobile operator billing with quantum pricing. In this case, a suggested price may still be provided if desired. On the other hand, in other embodiments, pricing in those geographic regions may be given in the home geographic region currency, and then the actual price charged may be based upon real-time foreign exchange rates.

Returning to FIG. 2, after providing suggested prices for the second geographic region and any other geographic regions that are supported, method 200 next comprises, at 228, receiving an input of a selected price for the second geographic region. Further, as indicated at 230, selected prices for other geographic regions also may be received.

Next, method 200 comprises, at 232, determining whether the selected price for the second geographic region is equal to the suggested price for the second geographic region (or any other permissible price in that region). It will be understood that this process is also performed for any other geographic regions. If it is determined that the selected price is equal to the suggested price for the second geographic region, or if the selected price is equal to another permissible price in the second geographic region, then at 234, billing is enabled for the digital content item via each of the plurality of billing channels in the second geographic region, including mobile operator billing channels and non-mobile operator billing channels. On the other hand, if it is determined that the selected price is not equal to the suggested price for the second geographic region, then at 236, billing is enabled for the content item via a third subset of billing channels (as distinguished from the first and second subsets indicated at blocks 214 and 216) for which the selected price is permissible. Further, at 238, billing is not enabled for the digital content item via a fourth subset of billing channels for which the second selected price is not permissible in the second geographic region.

Figure 5:
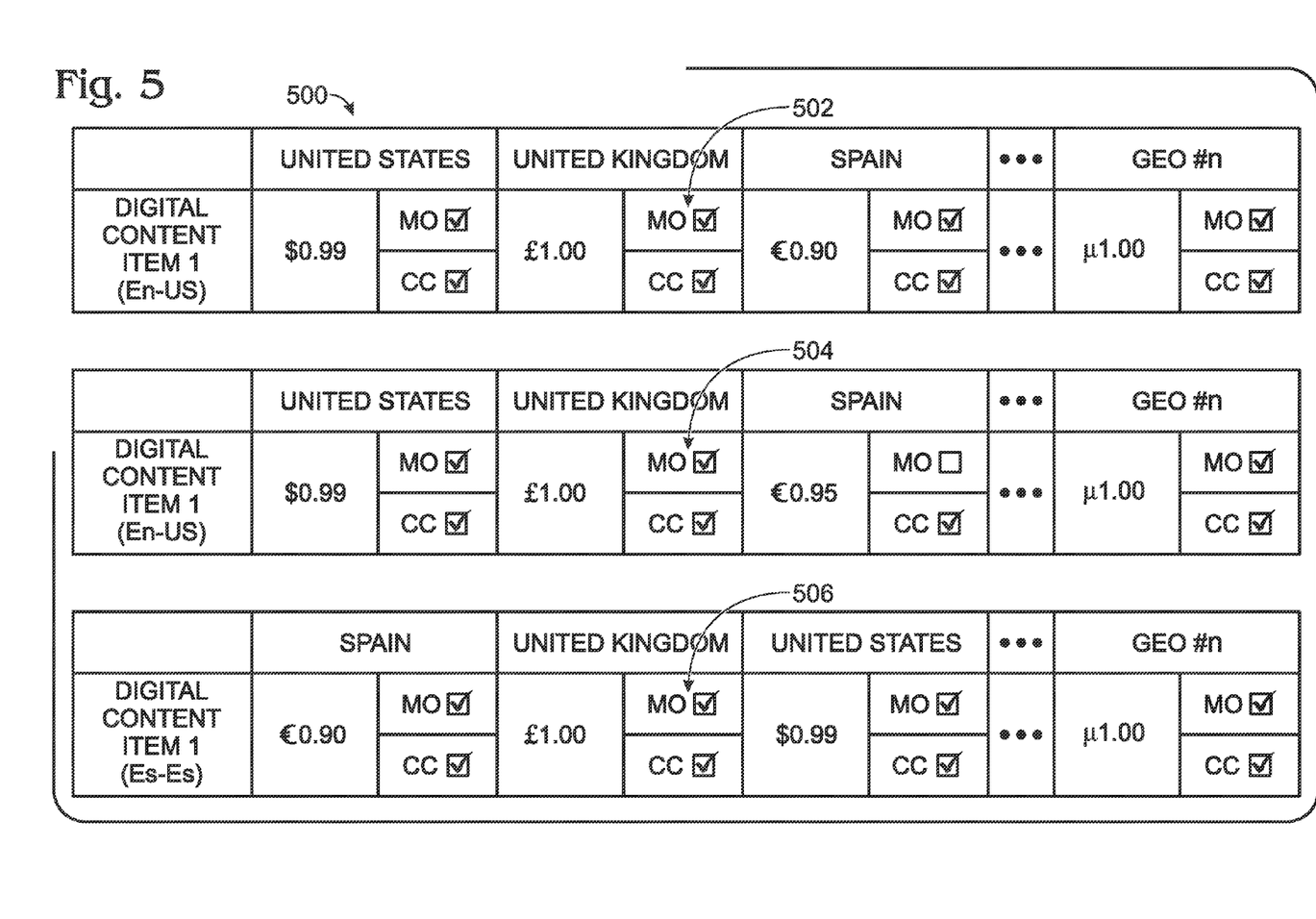
FIG. 5 shows an example embodiment of a plurality of price inputs made by a digital content provider.

In this manner, prices may be set for a digital content item for sales in markets other than the home geographic market that may be implemented by mobile operators in the purchaser's local market. FIG. 5 shows two examples of selected prices that have been input by a content provider for an English-language digital content item with a home geographic region of the United States ("En-US"). As can be seen in the first example 500, the content provider has selected a price of $0.99US for the content item in the U.S. Because this price is a permissible price by all of the hypothetical mobile operators in the US (from the table of FIG. 2), a billing menu 502 shows that both mobile and non-mobile billing (labeled "CC", or _Credit Card billing), are enabled in the U.S. Further, it can be seen that permissible prices were selected from the list of suggested prices for other geographic regions. Therefore, mobile operator billing is enabled for each of the other geographic regions.

In comparison, in the second example at 504, it can be seen that the content provider selected suggested prices for each geographic region except for Spain, where a price of 0.95 Euros was selected. In this case, referring to FIG. 3, this price point is not permissible by all of the hypothetical mobile device operators in Spain. Therefore, as shown at 504, because the selected price for Spain is not permissible by all mobile operators in Spain, mobile operator billing is not selected for Spain.

FIG. 5 also shows an example 506 of selected prices for a Spanish-language version of the same content item that is intended for a home geographic region of Spain. It can be seen that a price has been selected of 0.9 Euros in Spain, and corresponding prices from the suggested price list have been selected for the other geographic regions for this content item, as mobile operator billing is enabled for all geographic regions shown. It will be understood that the Spanish language version of the application for the home market of Spain may be priced differently in Spain (e.g. 0.9 Euros) than the English language version of the application for the U.S. home market (e.g. 0.95 Euros). In this case, only the Spanish language version will be available for mobile operator billing in Spain. Likewise, in other examples, both versions may have the same price, and both may or may not be eligible for mobile operator billing, depending upon the prices selected by the content provider.

Figure 6:
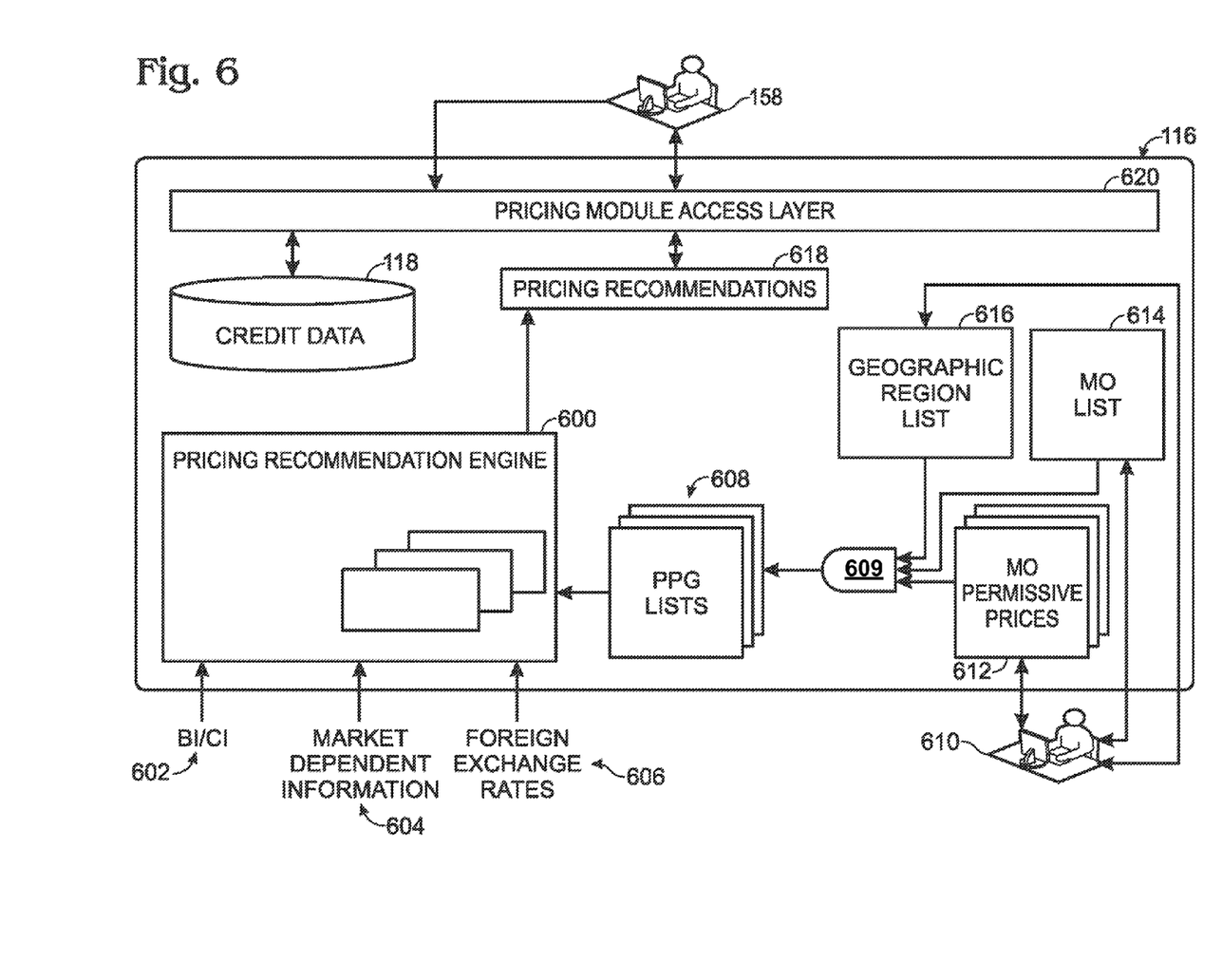
FIG. 6 shows a block diagram depicting an example embodiment of a system for determining a list of suggested prices for a digital content item in a plurality of geographic regions.

FIG. 6 shows a block diagram of an embodiment of a digital content server system for determining a list of suggested prices for a digital content item in a plurality of geographic regions. It will be noted that the system is shown implemented via the digital content server system 116, database 118, and developer console 158 of FIG. 1, but it will be understood that the system may be implemented via any other suitable component parts.

The digital content server system 116 comprises a price recommendation engine 600 configured to accept various inputs, and to produce price recommendations for content provider pricing in one or more geographic regions. For example, as described above, the price recommendation engine may be configured to accept inputs of business intelligence/customer intelligence 602, market dependent information 604, foreign exchange rates 606, and any other such information. Further, the pricing recommendation engine 600 may be configured to accept inputs of a PPG list 608 for each geographic region served by the digital content server system 116, where each PPG list 608 comprises a list of prices that are permissible by each supported mobile operator billing system in that geographic region.

The digital content server system 116 also may comprise logic 609 for assembling the PPG lists. Logic 609 may be configured to receive various inputs from an administrative console 610, including but not limited to permissible prices for each mobile operator 612, a mobile operator list 614, and a geographic region list 616. Logic 609 may then be configured to construct each PPG list 608 by locating common permissible prices in each geographic region.

The digital content server system 116 also may be configured to receive content data from the developer console 158, and to store the content data in database 118. Further, the digital content server system 116 may comprise a pricing module access layer 620 configured to communicate pricing information between the developer console 158 and the pricing recommendation engine 600. For example, the pricing module access layer 620 may be configured to provide pricing recommendations 618 to the developer console 158, to receive pricing selections from the developer console 158, and to enable or disable mobile operator billing depending upon whether the selected prices are permissible prices.

In this manner, a content provider may quickly and easily choose desired prices for multiple geographic regions with immediate knowledge of whether the selected prices will allow customers to use mobile operator billing in each geographic region.

The embodiments herein decouple the relationship between geographical location and currency used in that location. For example, if a user in the U.S. wishes to purchase content for which France is a home country, because prices in currencies other than Euros have been set for the content, the U.S. purchaser may pay a U.S. price for the French item in U.S. dollars. Furthermore, if the same U.S.-based user is in France, the user may still pay for the item in U.S. dollars when purchasing the device through the user's U.S. account and/or via the user's U.S.-based device, as the digital content server may detect the user's home currency based upon the user's account information, and therefore bill the user in the user's home currency, no matter the geographic location from which the purchase is made.

The embodiments disclosed herein also allow a digital content provider to provide for the availability of mobile device billing for a diverse collection of mobile operators located in a plurality of geographic regions, and each with a potentially different permissible pricing structure. Likewise, the embodiments provide for the easy addition of new mobile operators, and/or new geographic locations, to the billing system. It will be understood that the configurations and/or approaches described herein for pricing digital content items are presented for the purpose of example and not intended to be limiting, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and non-obvious combinations and subcombinations of the various processes, systems and configurations, and other features, functions, acts, and/or properties disclosed herein, as well as any and all equivalents thereof.

The invention claimed is:

1. A digital content server system configured to provide digital content to end users in a first geographic region and to enable payment for the digital content via a plurality of billing channels having different permissible prices, the digital content server system comprising:
a processor; and
memory comprising instructions executable by the processor to:
receive from a content provider an input of a digital content item;
send to the content provider a list of suggested prices, wherein each price in the list is permissible in each billing channel of the plurality of billing channels;
receive from the content provider an input of a selected price for the digital content item;
if the selected price for the digital content item is from the list of suggested prices, then enable billing for the content item via each of the billing channels of the plurality of billing channels; and
if the selected price for the digital content item is not from the list of suggested prices, then enable billing for the content item via a first subset of billing channels for which the selected price is permissible, and not enable billing for the content item via a second subset of billing channels for which the selected price is not permissible.

2. The digital content server system of claim 1, wherein the system is configured to provide digital content to end users in a second geographic region, and wherein the instructions are further executable to send to the content provider a suggested price for the second geographic region.

3. The digital content server system of claim 2, wherein the instructions are executable to provide digital content to end users in more than two geographic regions, and to send to the content provider suggested prices for each geographic region.

4. The digital content server system of claim 2, wherein the instructions are executable to determine the suggested price for the second geographic region based at least in part upon the selected price.

5. The digital content server system of claim 4, wherein the instructions are executable to determine the suggested price for the second geographic region based at least in part on one or more of foreign currency exchange rates, market-dependent information, business intelligence, and customer intelligence.

6. The digital content server system of claim 2, wherein the selected price is a first selected price, and wherein the instructions are further executable to receive from the content provider an input of a second selected price for the digital content item for the second geographic region.

7. The digital content server system of claim 6, wherein the suggested price for the second geographic region is a price that is permissible for use by a plurality of billing channels in the second geographic region, wherein the second selected price is not equal to the suggested price for the second geographic region, and wherein the instructions are further executable to:
enable billing for the content item via a third subset of billing channels in the second geographic region for which the second selected price is permissible, and not enable billing for the content item for a fourth subset of billing channels in the second geographic region for which the second selected price is not permissible.

8. The digital content server system of claim 6, wherein the suggested price for the second geographic region is a price that is permissible for use by a plurality of billing channels in the second geographic region, wherein the second selected price is equal to the suggested price for the second geographic region, and wherein the instructions are further executable to:
enable billing for the content item via each of the plurality of billing channels in the second geographic region.

9. The digital content server system of claim 1, wherein one or more billing channels are mobile operator billing channels with quantum pricing, and wherein one or more billing channels are non-mobile operator billing channels with continuum pricing.

10. In a computing device, a method of operating a mobile device digital content server system configured to provide digital content to mobile operator users in a plurality of geographic regions and to enable payment for the digital content via a plurality of billing channels, the method comprising:
receiving at the computing device from a content provider an input of a digital content item;
receiving at the computing device from the content provider an input of a home geographic region for the digital content item;
sending from the computing device to the content provider a list of suggested prices that are each permissible in each billing channel of a plurality of billing channels for the home geographic region, wherein one or more billing channels for the home geographic region utilize quantum pricing and one or more billing channels for the home geographic region utilize continuum pricing;
receiving at the computing device from the content provider an input of a selected price for the digital content item;
if the selected price for the digital content item is from the list of suggested prices, then enabling billing for the content item via each of the billing channels of the plurality of billing channels for the home geographic region; and
if the selected price for the digital content item is not from the list of suggested prices, then enabling billing for the content item via a first subset of billing channels of the plurality of billing channels of the home geographic region for which the selected price is permissible, while not enabling billing via a second subset of billing channels of the plurality of billing channels of the home geographic region for which the selected price is not permissible.

11. The method of claim 10, further comprising sending to the content provider suggested prices for a plurality of other geographic regions than the home geographic region based upon the selected price for the home geographic region.

12. The method of claim 11, further comprising determining the suggested price for the second geographic region based at least in part on one or more of the selected price, foreign exchange rates, market-dependent information, business intelligence, and customer intelligence.

13. The method of claim 11, further comprising determining the suggested prices for the plurality of other geographic regions based upon permissible prices in a plurality of billing channels for the plurality of other geographic regions.

14. The method of claim 11, wherein the selected price is a first selected price, and further comprising:
receiving a second selected price for a selected geographic region other than the home geographic region;
if the second selected price is not equal to the suggested price for the selected geographic region, then not enabling billing for the content item via a subset of billing channels of the plurality of billing channels in the selected geographic region for which the selected price is not permissible.

15. The method of claim 10, wherein two or more billing channels of the plurality of billing channels for the home region utilize quantum pricing with different permissible prices, and wherein the list of suggested prices comprises prices that are permissible to each billing channel that utilizes quantum pricing.

16. The method of claim 10, wherein the first subset of billing channels comprises billing channels that utilize continuum pricing, and wherein the second subset of billing channels comprises billing channels that utilize quantum pricing.

17. A digital content server system configured to provide digital content to mobile operator users in a plurality of geographic regions and to enable payment for the digital content via a plurality of billing channels, the digital content server system comprising:
a processor; and
memory comprising instructions executable by the processor to:
receive from a content provider an input of a digital content item;
receive from the content provider an input of a home geographic region for the digital content item;
send to the content provider a list of suggested prices that are each permissible in each billing channel of a plurality of billing channels for the home geographic region, wherein the plurality of billing channels for the home geographic region comprises two or more billing channels with quantum pricing and one or more billing channels with continuum pricing;
receive from the content provider an input of a selected price for the digital content item in the home geographic region;
if the selected price for the digital content item is from the list of suggested prices, then enable billing for the content item via each of the billing channels of the plurality of billing channels for the home geographic region;
if the selected price for the digital content item is not from the list of suggested prices, then enable billing for the content item via a first subset of billing channels of the plurality of billing channels of the home geographic region for which the selected price is permissible, while not enabling billing for the content item via a second subset of billing channels for which the selected price is not permissible;
send to the content provider suggested prices for a plurality of geographic regions other the home geographic region; and
receive from the content provider an input of a selected price for the digital content item for each geographic region other than the home geographic region.

18. The digital content server system of claim 17, wherein the first subset of billing channels comprises one or more non-mobile operator billing channels that utilize continuum pricing, and wherein the second subset of billing channels comprises one or more mobile operator billing channels that utilize quantum pricing.

19. The mobile device digital content server system of claim 17, wherein the instructions are executable to:

determine if the selected price for the digital content item for each geographic region other than the home geographic region is equal to the suggested price for that geographic region;

if not, then not to enable billing for the content item via billing channels that utilize quantum billing in that geographic region; and if so, then to enable billing for the content item via billing channels that utilize quantum billing in that geographic region.

20. The mobile device digital content server system of claim 17, wherein the instructions are further executable to determine the suggested prices for the plurality of geographic regions other the home geographic region based upon one or more of the selected price for the home geographic region, foreign exchange rates, market-dependent information, business intelligence, and customer intelligence.

\* \* \* \* \*